Figure 1:
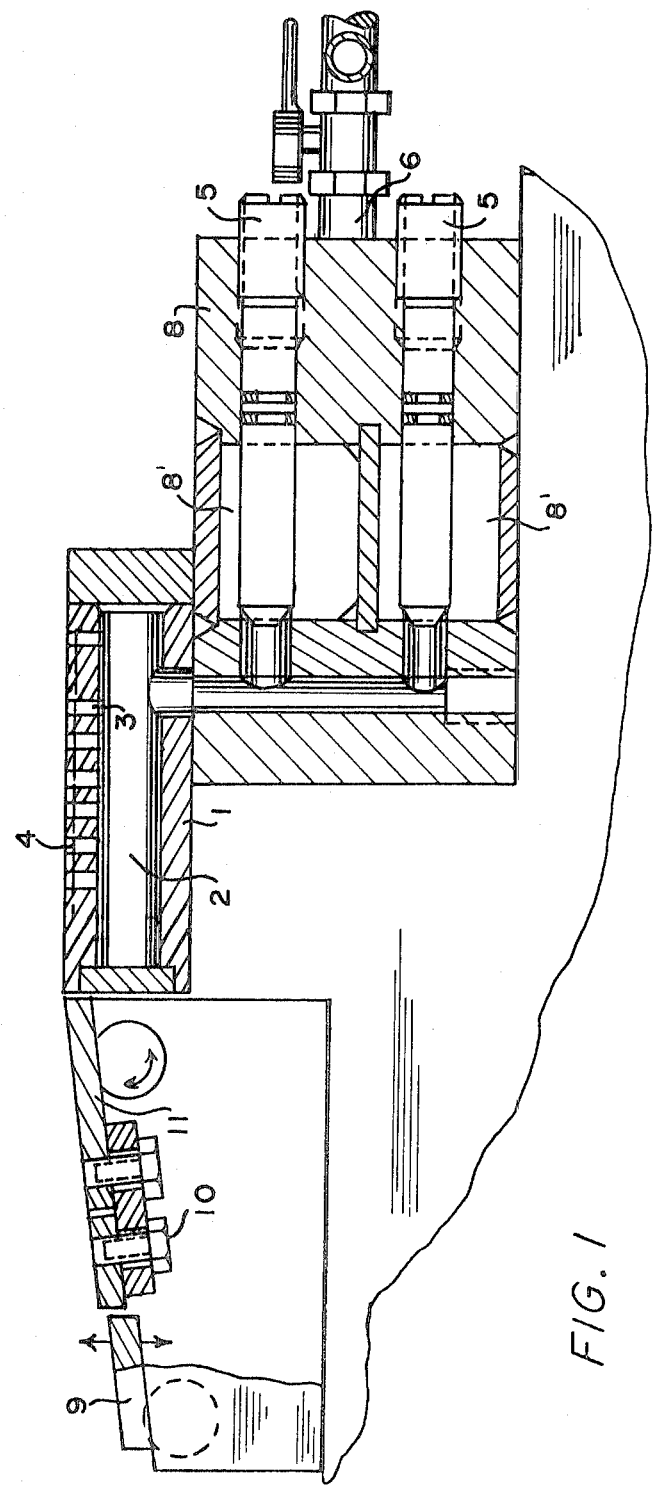

United States Patent

[11] 3,627,299

[72] Inventors Karl Schwarze;
Udo Schmiedeskamp, both of Oeynhausen, Germany
[21] Appl. No. 886,625
[22] Filed Dec. 19, 1969
[45] Patented Dec. 14, 1971
[73] Assignee Firma B. Schmiedeskamp K.G.
Bad Oyenhausen, Germany
[32] Priority Dec. 23, 1968
[33] Germany
[31] P 18 16 639.7

[54] SUCTION CLAMPING PLATE FOR THE GRIPPING OF THIN-WALLED WORKPIECES
4 Claims, 2 Drawing Figs.

[52] U.S. Cl..................................................... 269/21,
51/235, 137/608
[51] Int. Cl..................................................... B25b 11/00
[50] Field of Search........................................... 269/21, 9,
10; 279/3; 51/235; 248/362, 363; 137/608

[56] References Cited
UNITED STATES PATENTS

| 477,304 | 1892 | Marsh, Jr. ...................... | 51/235 |
| 873,340 | 1907 | Bagnall.......................... | 269/21 X |
| 3,253,665 | 5/1966 | Schienle ....................... | 51/235 X |
| 2,317,348 | 4/1943 | Wekeman ..................... | 51/235 |
| 2,443,987 | 6/1948 | Morrison et al. ............. | 279/3 X |

Primary Examiner—Andrew R. Juhasz
Assistant Examiner—James F. Coan
Attorney—Jacob L. Kollin ABSTRACT: A suction clamping plate for gripping of thin-walled workpieces. The suction space within the plate is subdivided into a pair of longitudinal channels. Suction bores extending from the channels are connected by annular grooves arranged to interengage on the bearing face of the plate. Dual screw valves are provided between the channels and suction lines for forming a vacuum in either one or both suction channels.

SUCTION CLAMPING PLATE FOR THE GRIPPING OF THIN-WALLED WORKPIECES

The invention relates to a suction clamping plate with suction space for the gripping of plane, thin-walled workpieces, such as plates of sheet metal, plastic, rubber or the like, in fabricating machines, the suction space being connected with the bearing face of the suction clamping plate by a plurality of bores arranged in the suction clamping plate.

Suction clamping plates like those named above are known as belonging to prior art. These suction clamping plates are used in particular for thin sheets, in particular sheets of nonferrous metals, which have little bending stiffness and are difficult to retain during machining, e.g. grinding, polishing or the like. One of the known constructions provides a rubber packing between the suction clamping plate and the workpiece. Suction clamping plates with elastic rubber packing, however, have disadvantages which must be seen in the fact that due to their very low bending stiffness the sheets cannot completely depress the rubber packing, so that the sheet does not rest flat on the clamping plate at the edge. Another disadvantage is that the great temperature rise occurring in various machining processes, e.g. in grinding, hardens or respectively destroys the rubber packing. Besides, the marginal folds normally present in the case of relatively large sheets prevent an uninterrupted contact of the sheet on the packing material.

To avoid these disadvantages, a suction clamping plate without rubber packing has become known, where a suction space parallel with the suction clamping plate is provided and this space is connected with the bearing face of the clamping plate by plurality of small bores of equal length arranged in the suction clamping plate. It has been noted that with this known suction clamping plate only a relatively low holding effect is obtained, which in many cases of machining is not sufficient to retain the clamped thin workpiece securely also against displacements.

Further, for the clamping of large plates or sheets a suction clamping plate has become known which is connected with the suction line by two apertures in the suction clamping plate, and which shows at its top annular or square grooves which in turn communicate with the two apertures. In addition, an annular rubber packing is arranged around the bearing face in a groove of the clamping plate. As has been stated, such a suction clamping plate with rubber packing cannot be used for the clamping of thin-walled workpieces of low bending stability, because when, for example, a thin sheet is subjected to suction, the edges thereof are pressed up by the rubber packing, that is, they are bent out of the sheet plane. Experiments have shown that with such a suction clamping plate without rubber ring packing only a slight adhesion effect is attainable, with the two apertures and the annular or square grooves, because the pressure difference produced in the suction line becomes operative only at few points of the plate due to the relatively narrow grooves. It was for this reason that the mentioned rubber ring packing was provided.

Further there has become know from German Pat. No. 1,045,766 a suction clamping plate where all bores are interconnected by a plurality of narrow grooves known in themselves, provided in the bearing face. The bores are so connected with one another by the straight grooves that bearing faces of approximately equal size, delimited by the grooves, are formed. It must be regarded as disadvantageous in this design that all bores are connected with a single suction space and the vacuum is obtained through only one suction line. The result is that predominantly only those thin-walled workpieces can be machined whose dimensions are such that all bores are covered by the workpiece. If this is not the case, the remaining bores must be covered by a so-called shim, to insure the aspiration of the thin sheets or the like. When removing the thin-walled workpieces, the vacuum is eliminated, so that the shim becomes detached at the same time and must be positioned again each time, that is, with each workpiece to be machined.

Realizing the above-mentioned defects, the inventor set himself the task to disclose another form of construction of a suction clamping plate where the defects shown are eliminated.

The problem is solved according to the invention in that the suction space within a suction plate is subdivided in the form of longitudinal individual suction channels and the successive bores of each suction channel are connected by annular grooves arranged to interengage on the bearing face, and characterized in that the suction plate exhibits on one side a distributor block provided with screw valves operable from the outside lying side by side and one above the other and two suction lines, the suction lines communicating with the suction channels through passages in the distributor block, in such a way that the screw valves admit the individual suction channels to the effect that the vacuum in the individual suction channels and in the annular grooves thereabove can be created by one or respectively both suction lines.

Another feature of the invention is that the suction plate exhibits on the side opposite the distributor block a vertically displaceable stop which can be adjusted to the thin-walled plates to be machined.

At its front end, the stop has a sheet of wear-resistant material interchangeably retained by means of screws or the like.

The subject of the invention is further characterized in that below the sheet a shaft with handwheel or the like, serving for the vertical displacement thereof and formed eccentrically, is arranged.

The following description serves to explain the subject of the invention, of which an example of construction is represented in the drawing, in which:

FIG. 1 shows a side view in section, and

Figure 2:
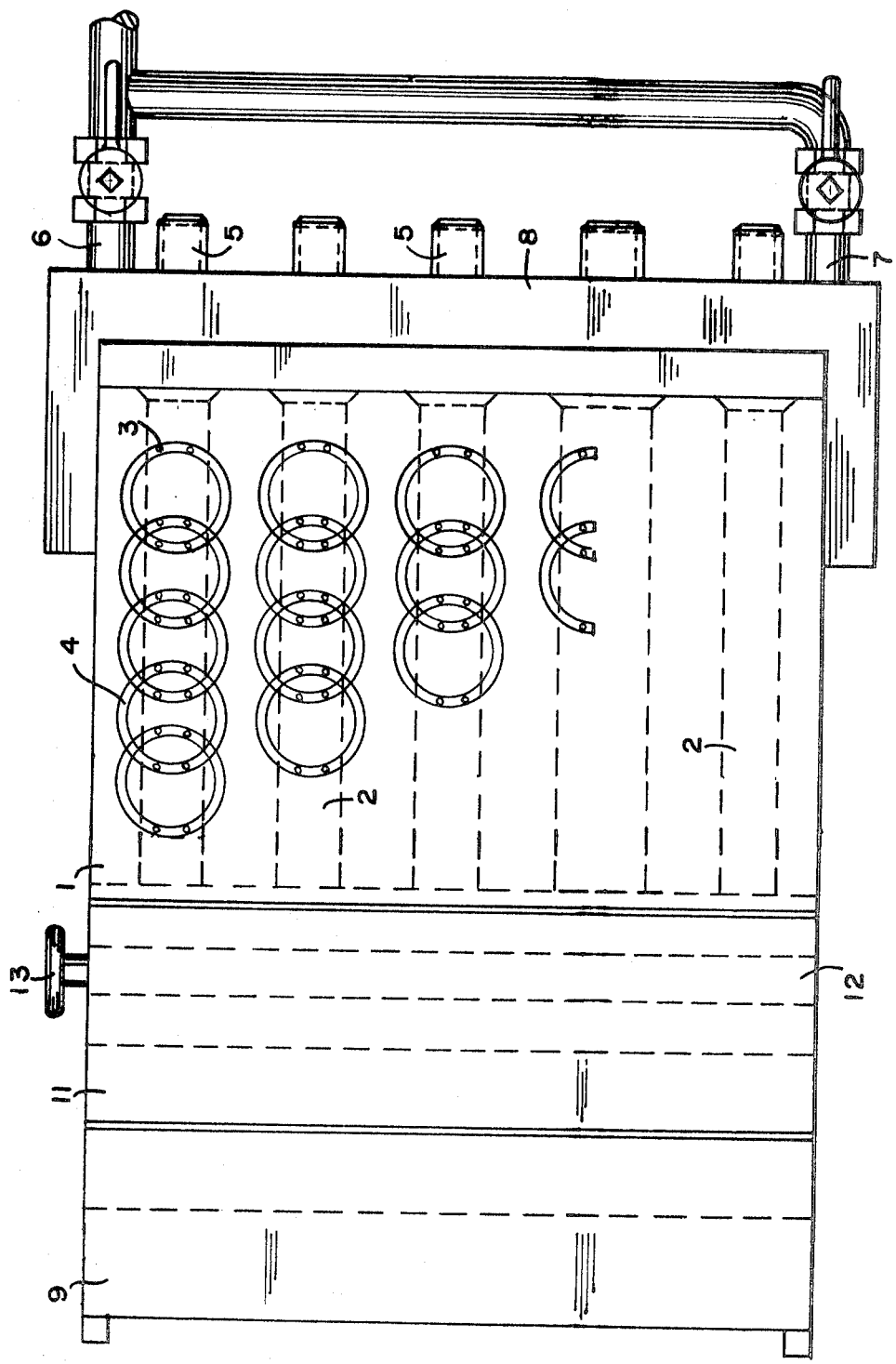

FIG. 2, a top view as per FIG. 1.

As the figures indicate, the actual suction clamping plate is designated by 1. The suction space, known in itself, is subdivided at said plate 1 into longitudinal single suction channels 2. The successive bores 3 on the bearing face of the suction clamping plate 1 communicate with the suction channel 2 therebelow and are interconnected by annular grooves 4 arranged to interengage (cf. FIG. 2). On the end face of suction clamping plate 1, the distributor block 8 is arranged, which presents the screw valves 5 operable from the outside and lying side by side and one above the other. These screw valves 5 pass through the upper and lower free spaces 8 ' in the distributor block 8 and close the same 8 ' from case to case.

In the region of the screw valves 5 the distributor block 8 presents two suction lines 6, 7, which communicate with the suction channels 2 through the passages 8 ' in the distributor block 8. According to the invention, each of the suction lines 6, 7 is connected with one of the passages 8' through another separate channel, so that, depending on the opening or closing of the screw valves 5, the vacuum can be created in the suction channels 2 via the suction lines 6 or 7.

Opposite the distributor block 8, a vertically displaceable stop 9 is arranged which can be adjusted to the height of the workpiece to be machined. For this purpose the shaft 12 carrying the stop 9 is formed eccentrically and provided with a handwheel 13. At the front end, stop 9 presents a separate, exchangeable sheet 11 of wear-resistant material, the connection between stop 9 and sheet 11 occurring through screws 10 or the like.

The mode of operation of the suction clamping plate according to the invention is as follows:

The thin-walled workpiece to be machined, such as a sheet, is placed on the suction clamping plate 1. Depending on the width of this workpiece, a shim known in itself is placed on to cover the remaining bores 3 with annular grooves 4. The vacuum for the aspiration of the workpiece is now created through the suction line 6 or 7. Assuming that the suction line 6 is in operative connection with the upper passage 8' in the distributor block 8 and through this line 6 the vacuum for the aspiration of the workpiece is to be obtained, then all upper screw valves 5 present in the width of the workpiece are opened. Accordingly the workpiece is aspirated by the cleared passage 8' via the suction lines 6. The remaining screw valves 5 of the upper valve row stay closed, so that no vacuum is created in the suction channels 2, which are closed by these remaining screw valves 5. The vacuum which is required for the retention of the shim is created through the second suction line 7. For this purpose, the valves 5 of the lower valve row lying in the region of the shim are opened. Now, with the aid of the lower passage 8', the vacuum can be created through suction line 7 in the suction channels 2 which are covered by the shim. The screw valves 5 of the lower valve row, which are present in the region of the applied workpiece, stay closed.

By the arrangement of two rows of screw valves 5 it has thus been rendered possible to machine workpieces of different width, because the remaining suction channels 2 can be covered by the shim without interruption of the vacuum for the aspiration of the shim when the vacuum for lifting off the machined workpiece is interrupted. The shim has the function to prevent that grinding dust or the like gets into the bores 3, and thus the production of the vacuum is possible should the suction channels 2 be later covered by wider workpieces. According to the invention, the number of open screw valves 5 of one valve row is the same as the number of closed screw valves of the other valve row.

The initially described vertically displaceable stop serves to prevent that as the grinding means, such as a grinding disk or the like impinges, the thin-walled plate or the like is lifted upward and damaged.

In the subject of the invention the possibility also exists to arrange in the individual suction channels pistons displaceable in the direction of the distributor block, so that also the length of the vacuum field can be predetermined.

The advantage in the subject of the invention is to be seen in that through the arrangement of two superposed valve rows and two separately working suction lines the vacuum for workpieces and shim can be produced and eliminated separately. Another advantage is to be seen in that by the formation of annular grooves in the surface of the suction clamping plate, which interconnect the individual bores, a maximum of suction force is created, so that the workpiece is pressed onto the suction clamping plate with a uniformly distributed pressure per area and is securely retained.

Another advantage is to be seen in the arrangement of the vertically displaceable stop, since through it damage to and upward pulling of the thin-walled workpieces upon impingement of the grinding means (grinding disk or the like) is avoided.

We claim:

1. Suction clamping plate with suction space for the clamping of plane, thin-walled workpieces, such as plates of sheet-metal, plastic, rubber or the like, in fabricating machines, the suction space being connected with the bearing face of the suction clamping plate by a plurality of bores arranged in the suction clamping plate, characterized in that the suction space is subdivided within the suction plate 1 in the form of longitudinal individual suction channels 2 and the successive bores 3 of each suction channel are connected by annular grooves 4 arranged to interengage on the bearing face, and characterized in that the suction plate 1 exhibits on one side a distributor block 8 provided with screw valves 5 operable from the outside lying side by side and one above the other and two suction lines 6, 7, the suction lines 6, 7 communicating with the suction channels 2 via passages 8' lying in the distributor block 8, in such a way that the screw valves 5 admit the individual suction channels 2 to the effect that the vacuum in the individual suction channels 2 and in the annular grooves 4 thereabove can be produced by one or respectively both suction lines 6, 7.

2. Suction clamping plate according to claim 1, characterized in that on the side opposite the distributor block 8 the suction clamping plate 1 presents a vertically displaceable stop 9 which is adjustable to the thin-walled plates to be machined.

3. Suction clamping plate according to claim, 1, characterized in that the stop 9 presents at its front end a sheet 11 of wear-resistant material retained interchangeably by means of screws 10 or the like.

4. Suction clamping plate according to claim 3, characterized in that below the sheet 11 an eccentrically formed shaft 12 with handwheel 13 or the like serving for the vertical displacement of the same 9 is arranged.

* * * * *